3,028,644
COMPOSITE ROD AND METHOD OF MAKING
Roy Waldrop, P.O. Box 19042, Houston, Tex.
No Drawing. Filed May 1, 1957, Ser. No. 656,191
5 Claims. (Cl. 22—202)

The present invention relates to a composite rod including a predetermined quantity and size of sintered tungsten carbide particles and to the process of forming same. In certain situations it is desirable to apply sintered tungsten carbide particles to various surfaces to take advantage of the cutting qualities of the carbide particles. For examples, quite often in oil field tools such as drilling bits, milling tools, overshots, or in other type fishing tools it is desirable to provide a hardened cutting surface on the surface of the tool to inhibit wearing thereof during use in drilling oil, gas and water wells. Additionally, it may be desirable to deposit the carbide particles on other surfaces or tools in order to take advantage of the arrangement of the carbide particles on the tool or surface for the cutting and wearing ability thereof.

Of course, it is necessary to deposit the carbide particles on the tool or surface in a manner so that the particles will remain bonded to the surface to which they are affixed. This prevents the particles from becoming knocked off during use of the equipment on which the carbide particles are bonded.

A great deal of difficulty has been encountered in attempting to permanently fix the tungsten carbide particles on the tool or surface and the present invention is directed to an article of manufacture, and to the method of making same which overcomes many of these problems.

In practicing the present invention, I utilize sintered tungsten carbide of the hardest steel cutting quality. The sintered tungsten carbide is crushed by any suitable means, such as for example, in an impact mill, and then they are screened by standard sieve screen methods into desirable sizes such as $3/8$ inch to $1/4$ inch, $1/4$ inch to $3/16$ inch, $3/16$ inch to $1/8$ inch, $1/8$ inch to $1/16$ inch, and 10 to 18 mesh, 18 to 30 mesh, and 30 to 45 mesh. The size of particles used will depend upon the particular purpose for which the tool or surface to which the tungsten carbide particles to be applied is used, and also upon the external diameter, or size of the tool to be desired after the particles have been positioned thereon.

The sintered tungsten carbide particles are washed in any suitable solution so as to thoroughly clean the particles from any foreign matter thereon. I have found that carbon tetrachloride serves this purpose quite well; however, when used sintered tungsten carbide particles are to be used in making the composite rod, it may be necessary to wash them with an additional solution so as to remove the brass, silver and other foreign materials thereon. I have found that nitric acid, in a suitable concentration may be used for this purpose quite well, and it may thereafter be neutralized in any suitable well known solution which neutralizes acid without forming undesirable deposits upon the surface of the sintered tungsten carbide particles.

Not only has a great deal of difficulty been encountered in providing a method of applying sintered tungsten carbide particles to a tool or surface so as to retain them on the tool or surface over an extended portion of time, but also a great deal of difficulty has been heretofore encountered in forming a composite rod including the sintered tungsten carbide particles. I have discovered that a composite rod may be formed including tungsten carbide particles so that the particles may in turn be deposited upon a tool or surface with a minimum of difficulty.

In order to form the composite rods, I use graphite molds, the graphite molds being less porous than other types of carbon molds which eliminates absorption by the mold of flux and other impurities which tend to cause defects in the composite rods formed in the molds. The graphite molds may be of any suitable size or shape, and I have found that molds which are 2 inches by 4 inches by 20 inches in length may be quite easily handled while practicing the process of the present invention. Additionally, the depth of the grooves as well as the length of the grooves in the molds may vary, depending upon the size rod to be formed; however, I normally employ two grooves in a mold of the above mentioned size which grooves are $3/8$ inch deep with a taper on each side varying from $9/16$ of an inch to $7/16$ of an inch depending upon the exact size of rod to be formed.

When forming a composite rod in the above referred to size, as governed by the size of the grooves in the mold, I weigh out a predetermined quantity of crushed tungsten carbide particles and evenly distributed the carbide particles in each of the grooves. I have determined that seven and one-half ounces of crushed tungsten carbide particles served the purpose quite well; however, in some circumstances it may be desirable to vary the exact amount of tungsten carbide particles to be employed in forming the composite rod.

After placing the seven and one-half ounces of crushed tungsten carbide particles in each of the grooves, and after evenly distributing the tungsten carbide particles along each of the grooves, I pre-heat the molds to approximately 600° F. The temperature range can actually vary between approximately 500° and 900° F., however if the mold is too cold, the process will not work as satisfactorily, and similarly if the temperature of the mold is too high then such high temperature tends to dry out the flux too quickly before the flux has an opportunity to flow around the carbide particles to insure proper treatment of all of the surfaces of the crushed tungsten carbide particles in each of the grooves. The 600° temperature above mentioned appears to work quite satisfactorily in that at this temperature the flux properly envelops all of the carbide particles in each of the grooves.

Any suitable flux may be used and I prefer a flux which may be dissolved in water and have found that when the flux is mixed in the ratio of three parts water to one part flux, it performs quite satisfactorily.

I have further determined that it is desirable to pre-heat the molds with an open flame. When the molds are thus pre-heated, the water is boiled out of the flux as it is poured into each of the grooves in the mold, leaving the chemical solids of the flux on the surface of each of the tungsten carbide particles. The agitation caused by the water boiling enables the chemical solids within the flux to completely envelop and completely coat each of the carbide particles, which in turn prevents oxidation of the carbide particles which oxidation would not allow the carbide particles to tin properly with the matrix.

After the tungsten carbide particles have been properly treated with the flux so as to insure tinning of the carbide particles with the matrix, two $3/16$ inch bare rods which are 18 inches in length may be placed in each groove. The composition of the rod may be as follows:

| | Percent |
|---|---|
| Copper | 48.58 |
| Zinc | 41 |
| Nickel | 10.25 |
| Silicon | 0.15 |
| Phosphorus | 0.02 |

The percentage of the nickel may vary between 10 and 12% without unduly affecting the results of the resulting product or the manner of forming it, and the percentages of the copper and zinc may be adjusted accordingly when the nickel is increased in percentage. The matrix, or two rods, are placed side-by-side on top of the carbide particles in each of the grooves of the mold. The rods are placed approximately one-half inch from the end of the mold to insure even flowage of matrix when heated to the melting point.

I have further discovered that it is desirable to heat the matrix or rod by means of an open flame so as to insure proper melting of the matrix or rods and subsequent flowing thereof into the mold and between the particles of tungsten carbide whereby the tungsten carbide particles become brazed with the matrix forming a resulting rod the shape of the mold in which the tungsten carbide particles and melted matrix reside.

The open flame may be of any suitable type which is hot enough to melt the matrix or rod, and I have found that an oxy-acetylene torch may serve the purpose quite well. However, it is desirable that the operator use a neutral flame, which means that the torch is adjusted so that there is not an excess of acetylene, nor is there an excess of oxygen, but a neutral flame is used to melt the matrix or rods and to flow them around the carbide particles in the graphite mold. The term "neutral" as applied to flames with an oxy-acetylene torch is well known in the art to a person skilled in using such equipment. The torch is held a suitable distance relative to the rods or matrix in each of the grooves of the molds so that they are heated to approximately 1650° F. The matrix melts and flows into the mold grooves surrounding the crushed tungsten carbide particles, thoroughly brazing the matrix with the tungsten carbide particles. In order to avoid deleterious effects upon the tungsten carbid eparticles, I employ a flux which melts at approximately 1400 to1650° F.; also the matrix melts within the same temperature range and when the flux begins to melt off the particles an indication is given that the proper temperature for melting of the matrix or rods is reached. This prevents over heating of the tungsten carbide particles and insures proper tinning or proper brazing of the matrix and the carbide particles.

Heretofore, the molds have been heated in a furnace, but this appears to, for some unknown reason, bring about deleterious effects in the finished composite rod including the matrix and the tungsten carbide particles, which deleterious effects or results do not occur when the composite rod including the matrix and the tungsten carbide particles is formed by use of an open flame.

After the rods have cooled they are removed from the mold and may be boiled in a vat of water for a suitable length of time, such as two hours. This boiling removes the burned flux and other impurities off the rods and the rods may then be washed again with cool water to insure further removal of foreign matter and then if desired they may be buffed or polished by any suitable means such as a high-speed polisher.

It can be appreciated from the foregoing description, that I form a composite rod by means of pre-heating the molds, prior to the time that the flux is applied to the tungsten carbide particles in the mold, and I melt the matrix by means of an open flame. This appears to insure non-overheating of the tungsten carbide particles and aids in proper tinning of the tungsten carbide particles with the matrix for forming a bond therebetween. If the tungsten carbide particles are not properly brazed to the matrix, then when the composite rods are subsequently melted and applied to a surface of a tool or the like, the tungsten carbide particles will be more likely to chip or break off from the surface thereby obviating the beneficial results desired from the tungsten carbide particles on the surface. On the other hand, if the tungsten carbide particles are properly tinned and brazed with the matrix in the composite rod, when the composite rod is thereafter melted and applied to the surface of a tool or the like, the tungsten carbide particles bond to the surface of the tool or the like and remain in place over an extended period of use.

All of the percentages of composition given heretofore are upon a weight basis unless otherwise stated.

Broadly the present invention relates to a composite rod and to a process of forming same.

What is claimed is:

1. A process of forming a composite rod having crushed and sized particles of sintered tungsten carbide including the steps of washing the crushed, sized sintered tungsten carbide particles to clean the surfaces thereof, placing a predetermined quantity in a graphite mold of desired size and shape, heating the carbide particles and molds to a range of 500° F. to 900° F., pouring a liquid flux over the carbide particles while maintaining the molds heated to the range of 500° F. to 900° F., placing a matrix in the mold on the carbide particles, applying an open flame to the matrix to melt it whereupon it flows into the mold and becomes bonded with the sintered carbide particles.

2. A process of forming a composite rod having crushed and sized particles of sintered tungsten carbide including the steps of washing the crushed, sized sintered tungsten carbide particles to clean the surfaces thereof, placing a predetermined quantity in a graphite mold of desired size and shape, heating the carbide particles and molds to a range of 500° F. to 900° F., pouring a liquid flux over the carbide particles while maintaining the molds heated to the range of 500° F. to 900° F., placing a matrix in the mold on the carbide particles, said matrix having a composition including:

| | Percent |
|---|---|
| Copper | 48.58 |
| Zinc | 41.00 |
| Nickel | 10.25 |
| Silicon | 0.15 |
| Phosphorus | 0.02 | applying an open flame to the matrix to melt it whereupon it flows into the mold and becomes bonded with the sintered carbide particles.

3. A process of forming a composite rod having crushed and sized particles of sintered tungsten carbide including the steps of washing the crushed, sized sintered tungsten carbide particles to clean the surfaces thereof, placing a predetermined quantity in a graphite mold of desired size and shape, heating the carbide particles and molds to a range of 500° F. to 900° F., pouring a liquid flux over the carbide particles while maintaining the molds heated to the range of 500° F. to 900° F., placing a matrix in the mold on the carbide particles, said matrix having a composition including:

| | Percent |
|---|---|
| Copper | 46–48 |
| Zinc | 39–41 |
| Nickel | 10–12 |
| Silicon | 0.15 |
| Phosphorus | 0.02 | applying an open flame to the matrix to melt it whereupon it flows into the mold and becomes bonded with the sintered carbide particles.

4. A method of forming a composite rod having sintered tungsten carbide particles and formed without burning the tungsten carbide particles comprising the steps of washing crushed, sized sintered tungsten carbide particles to clean their surfaces of foreign substances, placing a predetermined quantity in an elongated graphite mold, heating the graphite molds and tungsten carbide particles with an open flame to a temperature range of 500° F. to 900° F., pouring a liquid flux over the carbide particles while maintaining the temperature of the mold from 500° F. to 900° F., and placing a matrix on the tungsten carbide particles, and applying an open flame to said matrix to melt it and bond the carbide particles and matrix together.

5. A method of forming a composite rod having sintered tungsten carbide particles and formed without burning the tungsten carbide particles comprising the steps of washing crushed sized sintered tungsten carbide particles to clean their surfaces of foreign substances, placing a predetermined quantity in an elongated graphite mold, heating the graphite mold and tungsten carbide particles with an open flame to a temperature of approximately 600° F., pouring a liquid flux over the carbide particles while maintaining the temperature of the mold at approximately 600° F., and placing a matrix on the tungsten carbide particles, and applying an open flame to said matrix to melt it and bond the carbide particles and matrix together.

References Cited in the file of this patent

UNITED STATES PATENTS

| | | |
|---|---|---|
| 604,569 | Ringstrom | May 24, 1898 |
| 1,686,150 | Fink | Oct. 2, 1928 |
| 1,910,884 | Comstock | May 23, 1933 |
| 1,977,128 | Hawkins | Oct. 16, 1934 |
| 2,398,132 | Cottrell | Apr. 9, 1946 |

FOREIGN PATENTS

| | | |
|---|---|---|
| 745,234 | Great Britain | Feb. 22, 1956 |

OTHER REFERENCES

Refractory Hard Metals, Schwarzkopf et al., The Macmillan Co., New York, 1953, pages 8 and 9.

Treatise on Powder Metallurgy, vol. I, Claus G. Goetzel, Interscience Publ. Inc., New York and London, 1949, pages 30 and 31.

Powder Metallurgy, edited by John Wulff, publ. by A.S.M., 1942, pages 20 and 21.